(12) United States Patent
Conrad-Hansen et al.

(10) Patent No.: US 7,463,758 B2
(45) Date of Patent: Dec. 9, 2008

(54) METHOD OF DERIVING A QUANTITATIVE MEASURE OF A DEGREE OF CALCIFICATION OF AN AORTA

(75) Inventors: Lars A. Conrad-Hansen, Frederiksberg (DK); Marleen de Bruijne, Copenhagen (DK); Francois Bernard Lauze, Copenhagen Nv (DK); Claus Christiansen, Skodsborg (DK); Mads Nielsen, Dragor (DK)

(73) Assignee: Nordio Bioscience A/S, Herlev (DK)

( * ) Notice: Subject to any disclaimer, the term of this patent is extended or adjusted under 35 U.S.C. 154(b) by 515 days.

(21) Appl. No.: 11/144,488

(22) Filed: Jun. 2, 2005

(65) Prior Publication Data

US 2006/0274927 A1     Dec. 7, 2006

(51) Int. Cl.
     *G06K 9/00*     (2006.01)
(52) U.S. Cl. .......................... 382/128; 382/274; 378/46
(58) Field of Classification Search ................. 382/100, 382/128, 129, 130, 131, 132, 133, 168, 181, 382/203, 224, 232, 260, 274, 276, 305, 134, 382/199, 220, 286, 292; 324/322; 606/194; 378/64, 46, 28, 140; 424/677; 514/2; 604/102.01
See application file for complete search history.

(56) References Cited

U.S. PATENT DOCUMENTS

| | | | | |
|---|---|---|---|---|
| 5,827,231 A | * | 10/1998 | Harada | ...................... 606/194 |
| 6,372,264 B1 | * | 4/2002 | Dixon | .......................... 424/677 |
| 6,551,990 B2 | * | 4/2003 | Giachelli et al. | ............... 514/2 |
| 6,679,861 B2 | * | 1/2004 | Yozu et al. | ............. 604/102.01 |
| 6,790,823 B1 | * | 9/2004 | Simonet et al. | ................. 514/2 |
| 6,977,987 B2 | * | 12/2005 | Yamashita et al. | ............ 378/64 |
| 7,046,835 B2 | * | 5/2006 | Launay et al. | .............. 382/132 |
| 7,230,429 B1 | * | 6/2007 | Huang et al. | ................ 324/322 |

* cited by examiner

*Primary Examiner*—Seyed Azarian
(74) *Attorney, Agent, or Firm*—Edwards Angell Palmer & Dodge LLP; Gregory B. Butler, Esq.

(57) ABSTRACT

A method of deriving a quantitative measure of a degree of calcification of a blood vessel such as an aorta by processing an image such as an X-ray image of at least a part of the blood vessel containing said calcification comprises: taking a starting set of digital data representative of an image of at least part of a blood vessel containing a calcification set against a background;
    estimating the boundary of the calcification;
    using inpainting to replace digital data in said starting set representing the calcification with data extrapolating the boundary of the background to extend over the area of calcification, and so generating an inpainted set of digital data; and
    computing the difference between the starting set of digital data and the inpainted set of digital data to obtain a quantitative measure of the degree of calcification of the blood vessel.

18 Claims, 10 Drawing Sheets

| Image number | 0201 | 0358 | 2719 | 2728 | 3130 | 3137 | 3168 | 3436 | 3613 | 4908 |
|---|---|---|---|---|---|---|---|---|---|---|
| Number areas | 1 | 2 | 3 | 5 | 8 | 3 | 3 | 2 | 8 | 4 |
| TV Inpainting | | | | | | | | | | |
| Dif total | 44171.96 | 461327.20 | 1379528.00 | 4750437.00 | 4009024.00 | 228629.40 | 613184.30 | 2668010.00 | 911247.00 | 247484.00 |
| SNR total | 1.9 | 5.9 | 7.4 | 18.1 | 15.4 | 5.4 | 6.6 | 12.7 | 8.4 | 4.2 |
| Harmonic Inpainting | | | | | | | | | | |
| Dif total | 53267.62 | 526273.90 | 1392392.00 | 4849783.00 | 4391740.00 | 239943.10 | 617363.90 | 3186955.00 | 952582.90 | 235077.00 |
| SNR total | 1.9 | 5.7 | 6.2 | 15.5 | 14.2 | 4.8 | 5.6 | 12.8 | 7.4 | 3.3 |
| Average Inpainting | | | | | | | | | | |
| Dif total | 59967.00 | 556648.00 | 1584807.00 | 4597990.00 | 3930929.00 | 236618.00 | 651347.00 | 2933249.00 | 992065.00 | 253890.00 |
| SNR total | 2.4 | 6.7 | 7.8 | 16.2 | 14.1 | 5.3 | 6.7 | 13.1 | 8.5 | 4.0 |
| Gold Standard | | | | | | | | | | |
| Standard 24 | 1 | 3 | 4 | 9 | 7 | 3 | 4 | 3 | 8 | 4 |
| Standard 8 | 1 | 2 | 3 | 6 | 5 | 3 | 3 | 2 | 5 | 4 |
| Standard 4 | 1 | 2 | 2 | 4 | 3 | 3 | 2 | 2 | 3 | 3 |

METHOD OF DERIVING A QUANTITATIVE MEASURE OF A DEGREE OF CALCIFICATION OF AN AORTA

BACKGROUND OF THE INVENTION

The present invention relates to a method of deriving a quantitative measure of a degree of calcification of an aorta.

Inpainting is a technique that originates from retouching paintings where one wants to recreate lost or damaged structures in a legible way. Digital inpainting uses spatial or frequency information to restore partially damaged/removed images.

Various inpainting techniques are known that enable image restoration, in particular for photographs, videos and films.

It is known to detect and inpaint small regions in mammograms that possibly define a micro calcification to enable detection of calcified regions. Subsequently, features such as the average and the standard deviation of intensity values are extracted from both the pre- and the post-inpainting regions. A classifier is trained to distinguish between true micro calcifications and false positives based on the extracted features. The comparison between a region and its inpainting is used to enable detection. Thus a binary decision of whether a region is abnormal, i.e. different from its surroundings, is made.

There are, however, no methods available at present that use inpainting to give more than a basic indication of the presence of a calcification. In the present invention, it has been realised that such a method may be useful in the diagnosis of various diseases, for example, atherosclerosis.

Atherosclerosis is a process in which deposits of fatty substances, cholesterol, cellular waste products, calcium and other products build up in the inner lining of an artery.

Previous known methods of assessing atherosclerotic plaque include the assessment of the calcification index on lateral 2-D x-rays. In this method, aortic calcification is assessed at each vertebral segment. Calcific deposits are regarded as present if the densities are visible in an area parallel to the lumbar spine and anterior to the lower part of the spine. As the abdominal aorta in the L1-L4 region of the spine is occasionally situated lateral to the spine, aortic densities of the lumbar region can sometimes overlap the vertebrae. Densities overlapping the vertebrae are scored present only if they extend from or form a clear pattern with those of the lower part of the aorta. Calcific deposits in the abdominal aorta adjacent to each lumbar vertebra are assessed separately for the posterior and anterior wall of the aorta using the midpoint of the intervertebral space above and below the vertebrae as boundaries.

The lesions are graded according to specific categories: Lesions with small scattered deposits that extend along less than ⅓ of the longitudinal wall of the aorta; lesions where ⅓ or more, but less than ⅔ of the longitudinal wall is calcified and lesions where ⅔ or more of the longitudinal wall is calcified.

SUMMARY

The present invention seeks to provide a more accurate measure of the degree of calcification of the aorta or more generally any blood vessel using inpainting techniques. There is accordingly provided a method of deriving a quantitative measure of a degree of calcification of a blood vessel by processing an image of at least a part of the blood vessel containing said calcification, which method comprises:

taking a starting set of digital data representative of an image of at least part of a blood vessel containing an area of calcification, said area of calcification being set against a background area;

using an inpainting method to replace digital data in said starting set of digital data representing the calcification with data extrapolating the background to extend over the area of calcification, and so generating an inpainted set of digital data; and computing the difference between the starting set of digital data and the inpainted set of digital data to obtain a result representative of the degree of calcification of the blood vessel.

The method may comprise the preliminary steps of estimating a boundary of the area of calcification, wherein the step of inpainting comprises replacing digital data within the boundary with data extrapolating the background outside the boundary to extend over the area within the boundary. Generally inpainting propagates data values in said boundary region into replacement data values for the selected area of calcification. Inpainting methods are described in numerous previous publications including US2004/0164996, U.S. Pat. No. 6,587,592, US2003/0012453 and US 2004/0161153, all of which are hereby incorporated by reference.

The method of the invention may further comprise:

calculating a signal to noise ratio along the boundary of the calcification between the inpainted set of digital data and the starting set of digital data;.

increasing the area within the boundary, and repeating the step of calculating the signal to noise ratio along the boundary; and repeating the steps of increasing the area within the boundary and then calculating the signal to noise ratio between the inpainted set of digital data and the starting set of digital data along the boundary until a maximum signal to noise ratio is reached.

Such methods may further comprise calculating the average intensity difference between the inpainted set of digital data and the starting set of digital data, wherein the difference is-representative of the degree of calcification of the blood vessel.

Methods of inpainting suitable for use include all those currently known in the art or which may be developed hereafter including without limitation TV inpainting harmonic inpainting and average inpainting.

Such methods may be applied to any blood vessel but preferably to an artery, particularly the aorta.

The invention may be embodied in a preprogrammed computational device or an instruction set for such a device adapted to carry out the above method.

BRIEF DESCRIPTION OF DRAWINGS

Embodiments of the present invention will hereinafter be described, by way of example, with reference to the accompanying drawings, in which.

DESCRIPTION OF PREFERRED EMBODIMENTS

To generate a quantitative measure of the degree of calcification in the aorta the following steps can be taken:
1. Obtain lateral 2-D x-ray images of the spine.
2. Estimate the location of the aorta.
3. Detect calcified areas.
4. Obtain a quantitative measure of the degree of calcification.
5. Output the result.

The present invention is primarily concerned with Step 4, the actual process involved in obtaining a quantitative measure of the degree of calcification.

Methods of obtaining x-ray images are well known. This step will therefore not be described herein. Step 2 of estimating the location of the aorta is described in SPIE Medical Imaging: Image Processing 2004, L. A. Conrad-Hansen et al. "Prediction of the location of the lumbar aorta using the first four lumbar vertebrae as a predictor", Edition 5370 (2), pgs 1271-1281.

In the described embodiment, lateral 2-D x-rays are used to provide a cost-efficient way of delivering reliable and easily reproducible data which may be used to extract information regarding the degree of calcification of the aorta.

Figure 1:
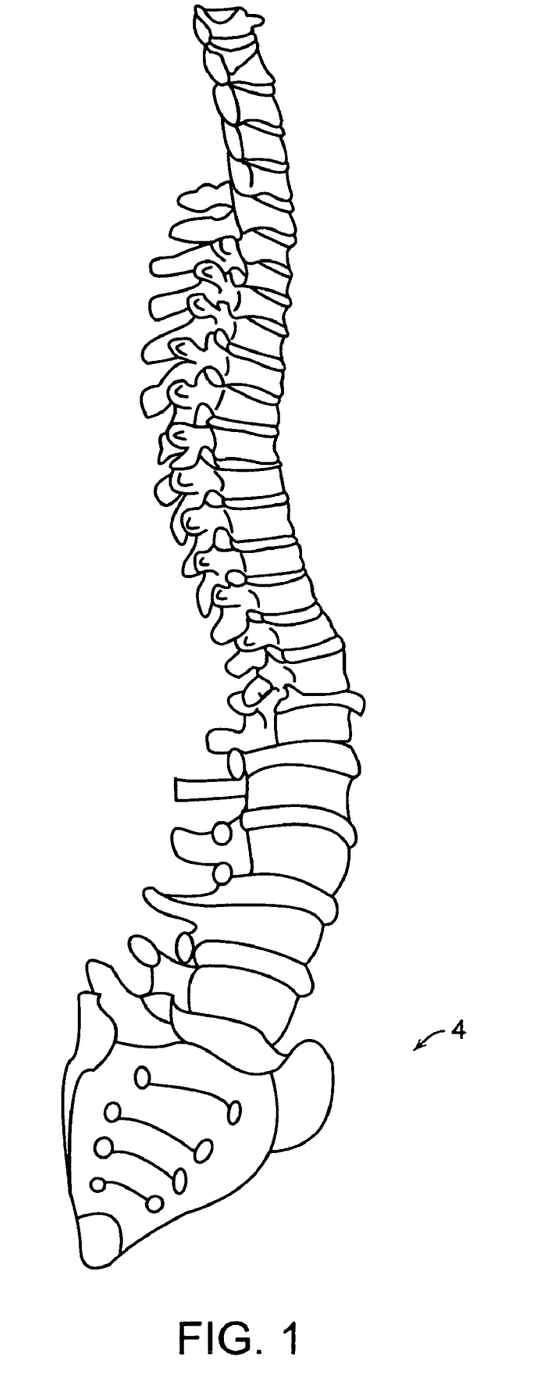
FIG. 1 shows a spinal column with the lumbar region indicated.

The region of interest for which x-ray images are required is the lumbar region, denoted by L1-L4 in FIG. 1. As a result of the proximity of the thoracic region of the aorta to the rib cage, x-ray images taken from the thoracic region are generally contaminated with some noise. Therefore, the lumbar region is used. Furthermore, bifurcation of the aorta with the first parts of the common iliac arteries most commonly occurs at L4, which restricts the region of interest to the first four lumbar vertebrae. The bifurcation causes surges in the blood stream, which in turn contribute to the calcification process, so that calcific deposits primarily occur at L4 followed by L3. Therefore, if calcific deposits are found in the area of the aorta corresponding to L2, then the aortic region corresponding to the lower lying vertebrae is almost always even more calcificied.

Inpainting is a known technique that originates from retouching paintings to recreate lost or damaged structures in a legible way. The term "Inpainting" is derived from fusing the words "Image" and "Interpolation" together. Three different variations of inpainting are herein described, TV inpainting, harmonic inpainting and average inpainting. TV inpainting is used for its ability to preserve structures to some extent, whereas harmonic inpainting is used as it provides much smoother solutions. The general Bayes' formulation of inpainting can be expressed as:

$$p(u \mid u_0) = \frac{p(u_0 \mid u)p(u)}{p(u_0)} \propto p(u_0 \mid u)p(u)$$

since $u_0$ is known.

The model term $p(u|u_0)$ models the data formation process. It can be assumed that the observed image $u_0$ is obtained from a clean image u corrupted by additive zero-mean Gaussian noise spatially uncorrelated and stationary, with standard deviation σ outside the hole Ω, and that the data inside Ω has been totally lost. Therefore the model of acquisition degradation is given by $$p(u_0 \mid u) = c_1 e^{-\sum_{x \in R \setminus \Omega} \frac{(u(x)-u_0(x))^2}{2\sigma^2}}$$

where C1 is the normalising constant. The prior term p(u) is usually difficult to find since it models the probability that a given array of pixel values represents a meaningful image. In the absence of texture, some form of smoothness for images is assumed, i.e. the variation of pixel values around a given pixel location should be small. Therefore, a discrete gradient operator, $\nabla u(x)$ encoding the local variations of the image around a given pixel location can be introduced.

The basics of TV inpainting will now be described. In order to enforce a reasonable smoothness, a Laplace distribution is assumed on all values, and the following prior is obtained:

$$p(u) = c_2 e^{-\sum_{x \in R} \frac{|\nabla u(x)|}{\mu}}$$

where $c_2$ is a normalising constant and $\mu\sqrt{2}$ the standard deviation. Using Maximum A Posteriori (MAP) criterion, taking—log( ) of each term, and then shifting to a continuous formulation, μ can be found by minimizing the following energy expression:

$$E(u) = \frac{1}{2\sigma^2}\int_{R/\Omega}(u-u_0)^2\,dx + \frac{1}{\mu}\int_R |\nabla u|\,dx$$

To make the integration boundaries equal, if χ denotes the function χ(x)=0 if x ∈Ω, χ(x)=1 otherwise, and $$\lambda = \frac{\sigma^2}{\mu}.$$

The resulting energy expression can be written as $$E(u) = \int_R \chi(u-u_0)^2 dx + \lambda \int_R |\nabla u| dx,$$

Having surpassed the problem with the integration boundaries, it is feasible to use the calculus of variations, so that a minimiser u for the energy is given by the following Euler-Lagrange equation $$\frac{\partial E}{\partial u} = \frac{\partial F}{\partial u} - \frac{\partial}{\partial x}\frac{\partial F}{\partial x \partial u_x} - \frac{\partial}{\partial y}\frac{\partial F}{\partial y \partial u_y}$$

where $F(u,u_x,u_y) = \chi(u-u_0)^2 + \lambda\sqrt{u_x^2 + u_y^2}$, so that:

$$\frac{\partial E}{\partial u} = 2\chi(u-u_0) - \lambda\frac{u_{xx}u_y^2 - 2u_x u_{xy} + u_{yy}u_x^2}{(u_x^2+u_y^2)^{\frac{3}{2}}} = 0$$

This scheme can be made discrete using gradient descent. However, it cannot be proven to yield a unique solution. A more elegant solution can be found by introducing the divergence of a vector field shown in FIGS. 2A, 2B and 2C. A vector field on $R^2$ is a map that attaches at every point P(x,y) (shown in figure x) a vector $$\bar{v}(P) = v(x, y) = \begin{pmatrix} v_1(x, y) \\ v_2(x, y) \end{pmatrix}$$

The divergence of $\bar{v}$ is given by:

$$div\bar{v} = \nabla \bar{v} = \frac{\partial v_1}{\partial x} + \frac{\partial v_2}{\partial y}$$

and expresses at a given point P, the local behaviour of the field.

Figure 2:
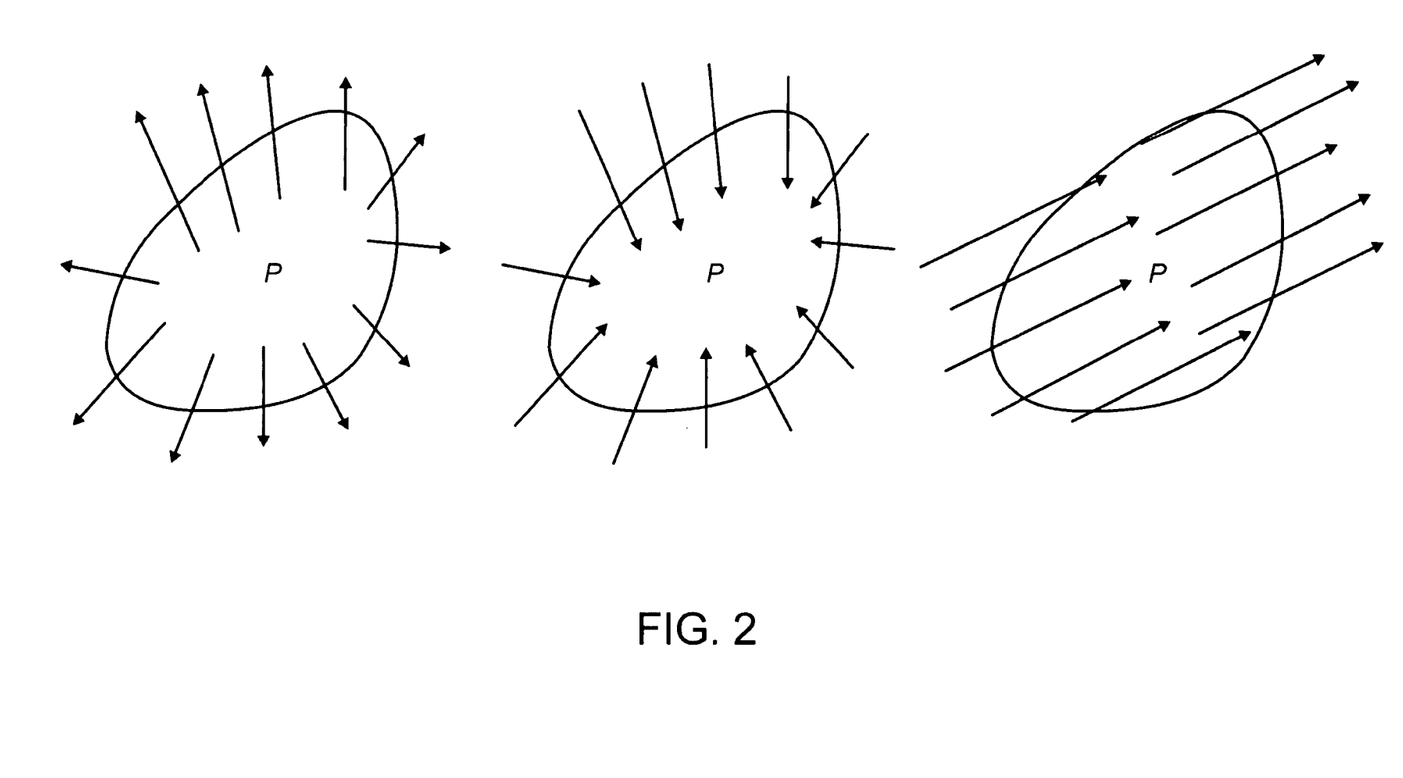
FIG. 2 shows an illustration of divergence at P resulting in varying densities of particles as described in the present invention.

As shown in FIG. 2A, where there is positive divergence of P, the vector field diverges in the neighbourhood of P and the density of particles in the field decreases. Similarly, as shown in FIG. 2B, where there is negative divergence, the vector field converges in the neighbourhood of P and the density of particles increases. Finally, where there is no divergence at P, as shown in FIG. 2C, the density of particles remains constant.

A natural divergence term therefore appears as:

$$\frac{\partial}{\partial x}\frac{\partial F}{\partial u_x} + \frac{\partial}{\partial y}\frac{\partial F}{\partial u_y} = div\begin{pmatrix} \frac{\partial F}{\partial u_x} \\ \frac{\partial F}{\partial u_y} \end{pmatrix}$$

which in the case of TV inpainting corresponds to the term:

$$div\begin{pmatrix} \frac{u_x}{\sqrt{u_x^2 + u_y^2}} \\ \frac{u_y}{\sqrt{u_x^2 + u_y^2}} \end{pmatrix} = div\left(\frac{\nabla u}{|\nabla u|}\right) = 0, \lambda = \frac{\sigma^2}{\mu}$$

so that the following Euler-Lagrange Partial Differential Equation (PDE) can be solved:

$$\chi(u - u_0) - \lambda div\left(\frac{\nabla u}{|\nabla u|}\right) = 0, \lambda = \frac{\sigma^2}{\mu}$$

This is a non linear elliptic equation, not well defined when $|\nabla u|=0$. This problem is usually fixed by replacing $|\nabla u|$ by $\phi(|\nabla u|^2)$ where $\phi(s^2)=\sqrt{s^2+\epsilon^2}$, $\epsilon>0$ small. The new equation to solve is then:

$$\chi(u-u_0) - 2\lambda div(\phi'(|\nabla u|^2)\nabla u) = 0$$

In order to cope with the non linearity, a fixed-point strategy is used for estimating the $\phi'(|\nabla u|^2)$. This leads to the following resolution algorithm:

1. Set $\beta^0(x) \equiv 1$
2. For $i = 0...N$ do
   * Compute the solution $u^i$ of the linear PDE
     $\chi(u^i - u_0) - 2\lambda div(\beta^i \nabla u^i) = 0$   (*)
   * Set $\beta^{i+1} = \phi'(|\nabla u^i|^2)$
3. Output $u^N$ Each linear equation (*) is made discrete and solved directly as follows. Given a pixel location $s \in R$, denote by $v(s)$ its 4-neighbourhood. If $r \in v(s)$, then $$\frac{r+s}{2}$$

will denote the mid-point between r and s. The discretization of the divergence is performed using central differences with half grid steps. Then, skipping the superscripts i, at pixel location s equation (*) is made discrete as:

$$\chi_s(u_s - u_{0s}) - 2\lambda \sum_{r \in v(s)} \beta_{\frac{r+s}{2}}(u_r - u_s) = 0$$

with boundary conditions incorporated as $u_r:=u_s$ whenever r falls out of R. The resulting system (for all $s \in R$) is solved by a Gauss-Seidel iterative scheme, which, at a given iteration reads For all $s \in R$ do $$u_s \leftarrow \frac{\chi_s u_{0s} + 2\lambda \sum_{r \in v(s)} \beta_{\frac{r+s}{2}} u_r}{\chi_s + 2\lambda \sum_{r \in v(s)} \beta_{\frac{r+s}{2}}}$$

where the symbol←means "replace the old value by the new one". The iterative process is stopped after a convergence criteria, which is reached when the change in $u_s$ falls beneath a certain threshold, has been fulfilled or after a fixed number of iterations. Note that it can be seen as a local lowpass filtering process—the filter coefficients are positive and their sum is 1—biased toward the original value $u_{0s}$ when $\chi_s=1$.

The coefficient $\beta_{r+s/2}^i$ can be made discrete as follows:

If s=(j,k), r=(j−1,k), it is required from the definition of $\beta^i$ to compute $|\nabla u^{i-1}|_{j-1/2,k}^2$. The x-derivative is approximated by a standard half grid step central difference, centered at $$j - \frac{1}{2}, k.$$

The y-derivative is interpolated using the central differences at (j,k) an at (j−1,k), so that $$|\nabla u^{i-1}|_{j-\frac{1}{2},k}^2 \approx (u_{jk} - u_{j-1k})^2 + \frac{1}{16}(u_{jk+1} - u_{jk-1} + u_{j-1k+1} - u_{j-1k-1})^2$$

Although it can be proven that a minimiser $\bar{u}^0$ always exists under reasonable conditions, it might fail to be unique. It is therefore necessary to specify a good starting value for $\bar{u}^0$ for the inpainting algorithm as it allows for faster convergence. Outside the inpainting domain $\Omega$, $\bar{u}^0(x,y)=u_0(x,y)$ and inside $\Omega$, $\bar{u}^0(x,y)$ is drawn from a Gaussian distribution with mean and variance corresponding to the mean and variance of $u_0$ outside $\Omega$.

For harmonic inpainting, a Gaussian distribution is assumed for the prior probability $$p(u) = c_2 e^{-\sum_{x \in R} \frac{|\nabla u(x)|^2}{2\mu^2}}$$

where $c_2$ again is a normalising constant and $\mu$ is the standard deviation. The energy term can then be expressed as $$E(u) = \int_R \chi(u-u_0)^2 dx + \lambda \int_R |\nabla u|^2 dx,$$

where $\chi$ denotes the function $\chi(x)=0$ if $x \in \Omega$, $\chi(x)=1$ otherwise, and $$\lambda = \frac{\sigma^2}{\mu^2}.$$

A third form of inpainting, average inpainting, constitutes the simplest form of inpainting, where $\Omega$ is filled homogeneously with the value S resulting from averaging over the immediate boundary of $\Omega$ according to $$S = \frac{1}{n}\sum_{i=1}^{n} t_i,$$

where n is the number of boundary pixels and t the respective pixel value.

The signal-to-noise ratio (SNR) is calculated for each pixel along the immediate boundary of the calcified area according to $$SNr = \frac{I_{inp} - I_{orig}}{std \times area},$$

where $I_{inp}$ denotes the inpainted image, $I_{orig}$ the original image, std the standard deviation of the estimated noise level, and area the number of pixels in $\Omega$. The mechanism is illustrated in the below algorithm and the results are shown on FIG. 3 on a test image.

---

Algorithm 1 Pixelwise expansion scheme:

1. let N = number of calcified areas in image
2. let B = number of pixels in an isocurve
3. let p denote a pixel
4. For i = 1...N do
   inpaint $\Omega$
   calculate SNR
   while SNR not max do
     calculate outer distance map
     find next isocurve
     For j = 1...B do
       expand $\Omega$ by $p_j$

---

-continued

Algorithm 1 Pixelwise expansion scheme:

inpaint and calculate SNR
   if SNR is increased, include $p_j$
   inpaint new $\Omega$
   calculate new SNR
5. output SNR.

---

Figure 3:
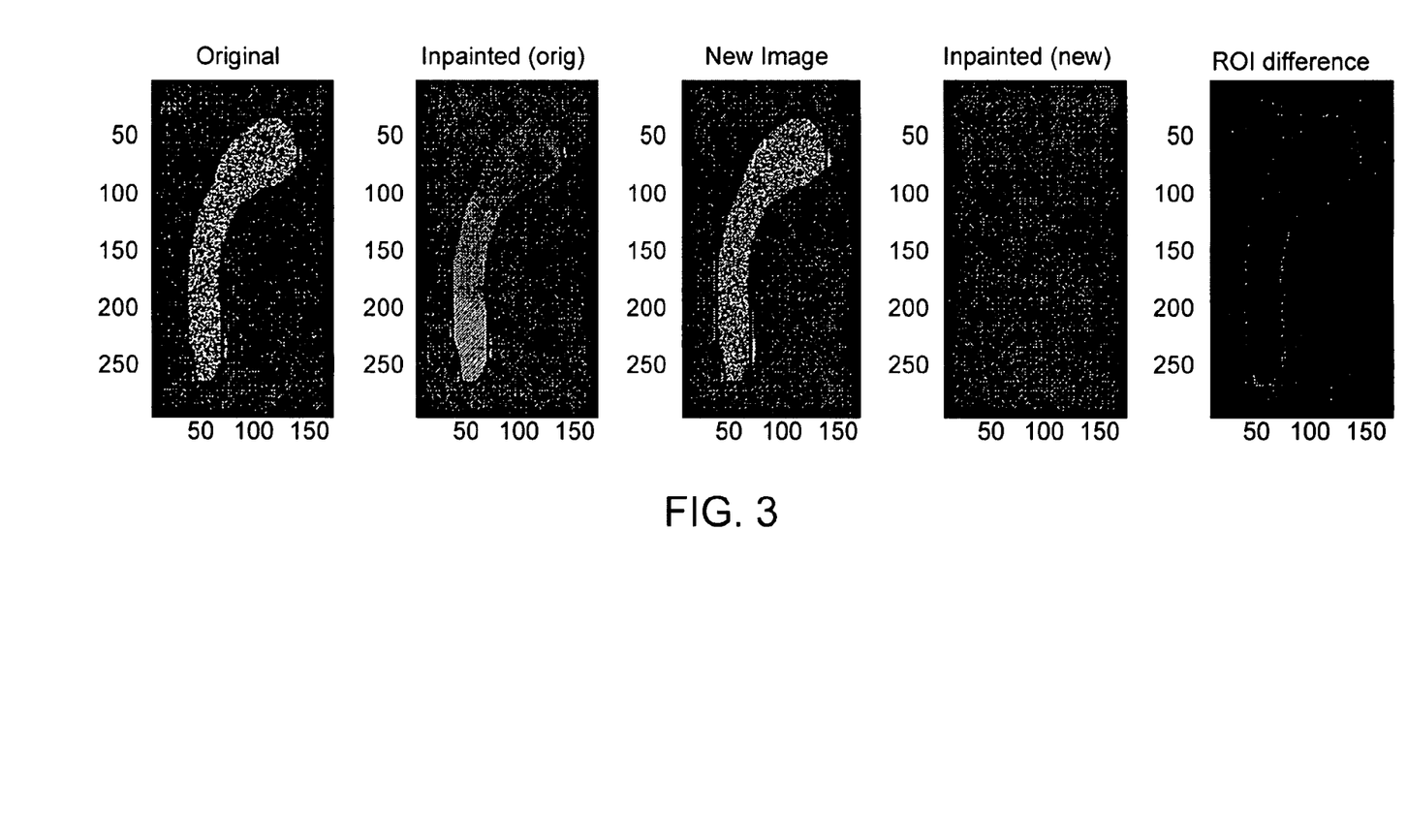
FIG. 3 shows an illustration of the algorithm of the present invention run on a test image.

As shown in FIG. 3, the algorithm starts with the original input image with faulty annotation (in this case, manual annotation). The area with the annotated boundary is inpainted, then, in accordance with the algorithm, the SNR ratio for each pixel along the boundary is calculated, and depending on the result of this, the boundary is redefined to include the calcified pixels that might have been undetected. Again, the area within the boundary is inpainted until the maximum signal to noise ratio is output.

The std denotes, as explained above, the standard deviation of the estimated noise level, and is computed by estimating the non-calcified background and taking the difference of the estimated and the actual background. The data set for the background estimation contains ninety hand annotated x-rays of the lumbar region with pixel intensities ranging from 0 to 2,048 with displays of various degrees of calcification.

Figure 4A:
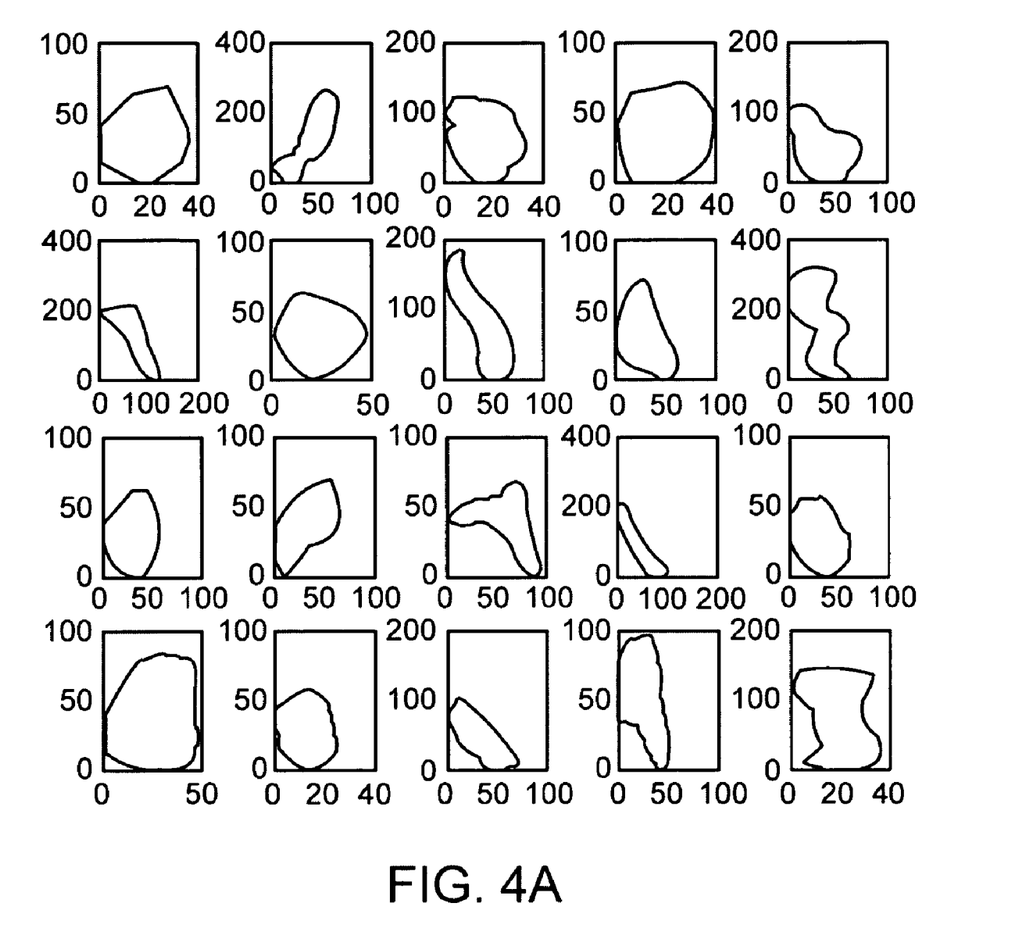
FIG. 4A shows the 20 sample area templates of the test image and FIG. 4B the regression lines in standard deviation against area in number of pixels for the three different inpainting methods.
Figure 4B:
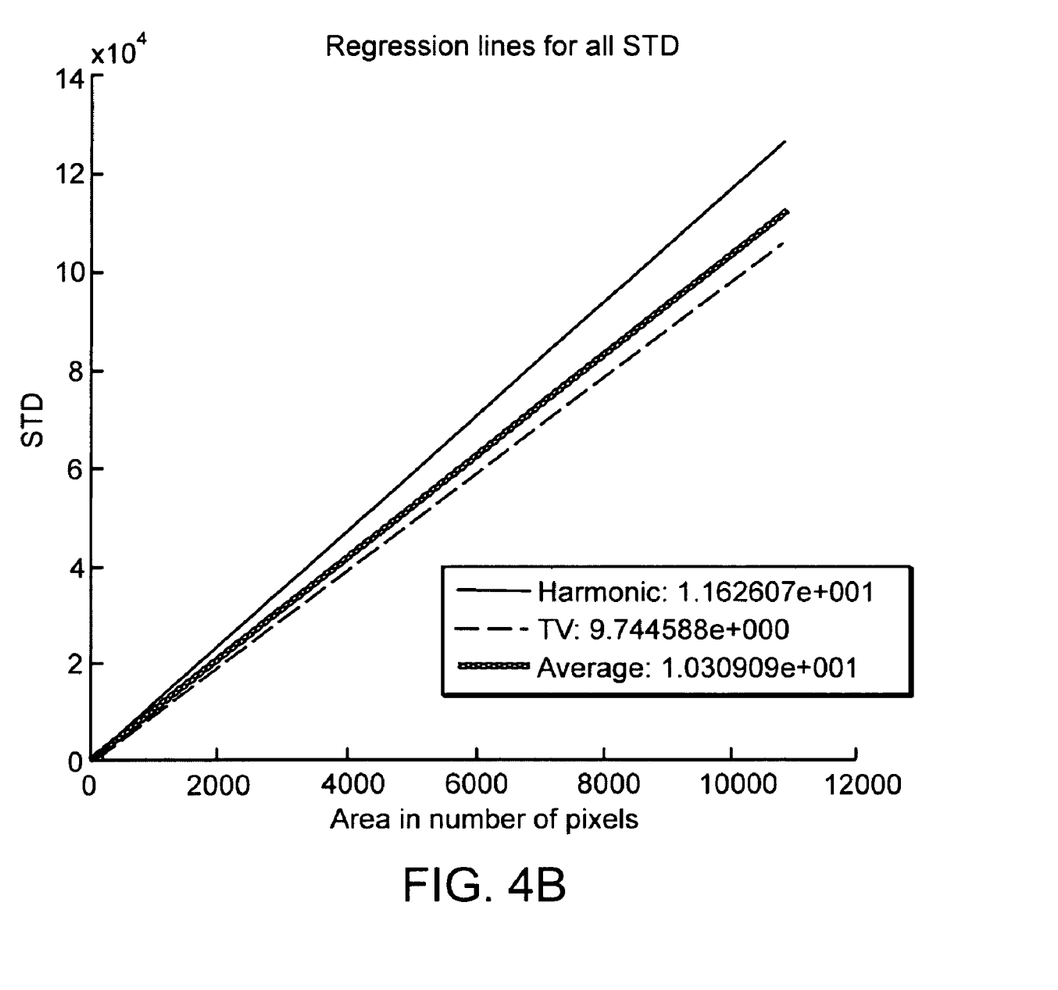

In order to estimate how well the individual inpainting techniques perfom on the x-ray images, 20 templates of calcification shape were chosen at random from manual annotations (see FIG. 4A). Each template was placed at 80 randomly chosen non-calcified aorta segments in different images and the intensity differences betweeen the inpainted area and the original area were computed. For each area template the distance map was calculated. The standard deviations for the error estimates were calculated for each individual area bounded by the isocurves (i.e. curves that have the same distance to an initial reference curve along the entire boundary) resulting from the distance map. FIG. 4B shows regression lines through the calculated standard deviations. The regression lines express the standard deviations in the total intensity difference for the three inpainting methods as a function of areasize.

|     | TV  | Harmonic | Average |
| --- | --- | --- | --- |
| std | 9.8 | 11.6 | 10.3 |

The above table shows the standard deviations of the pixelwise error for the three inpainting methods. From this it can be seen that TV inpainting produces the least error per pixel whereas harmonic inpainting performs worst.

Figure 5A:
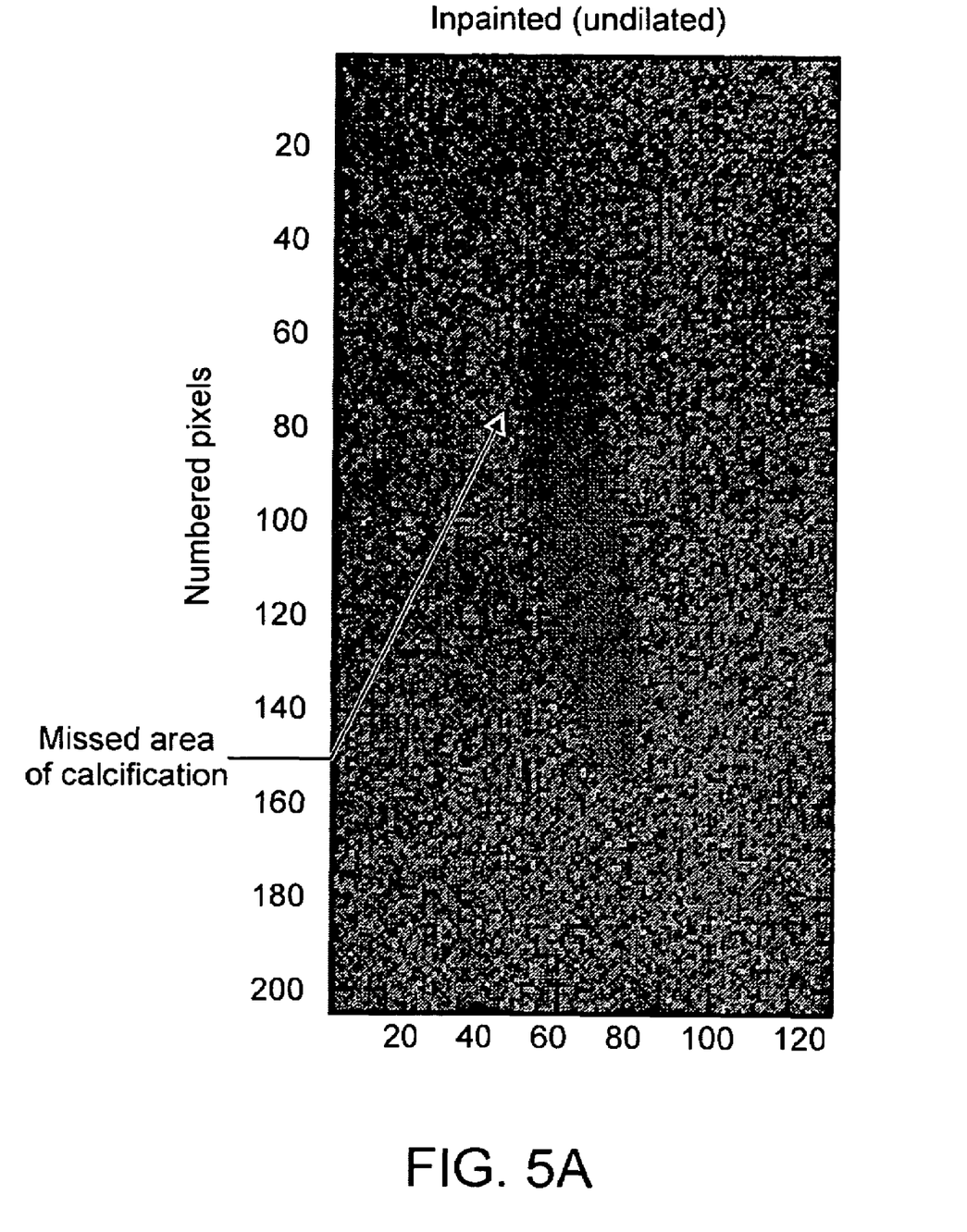
FIGS. 5A and 5B illustrate the bias introduced in the inpainting procedure, due to minor calcific deposits that were overlooked in the manual annotation process.
Figure 5B:
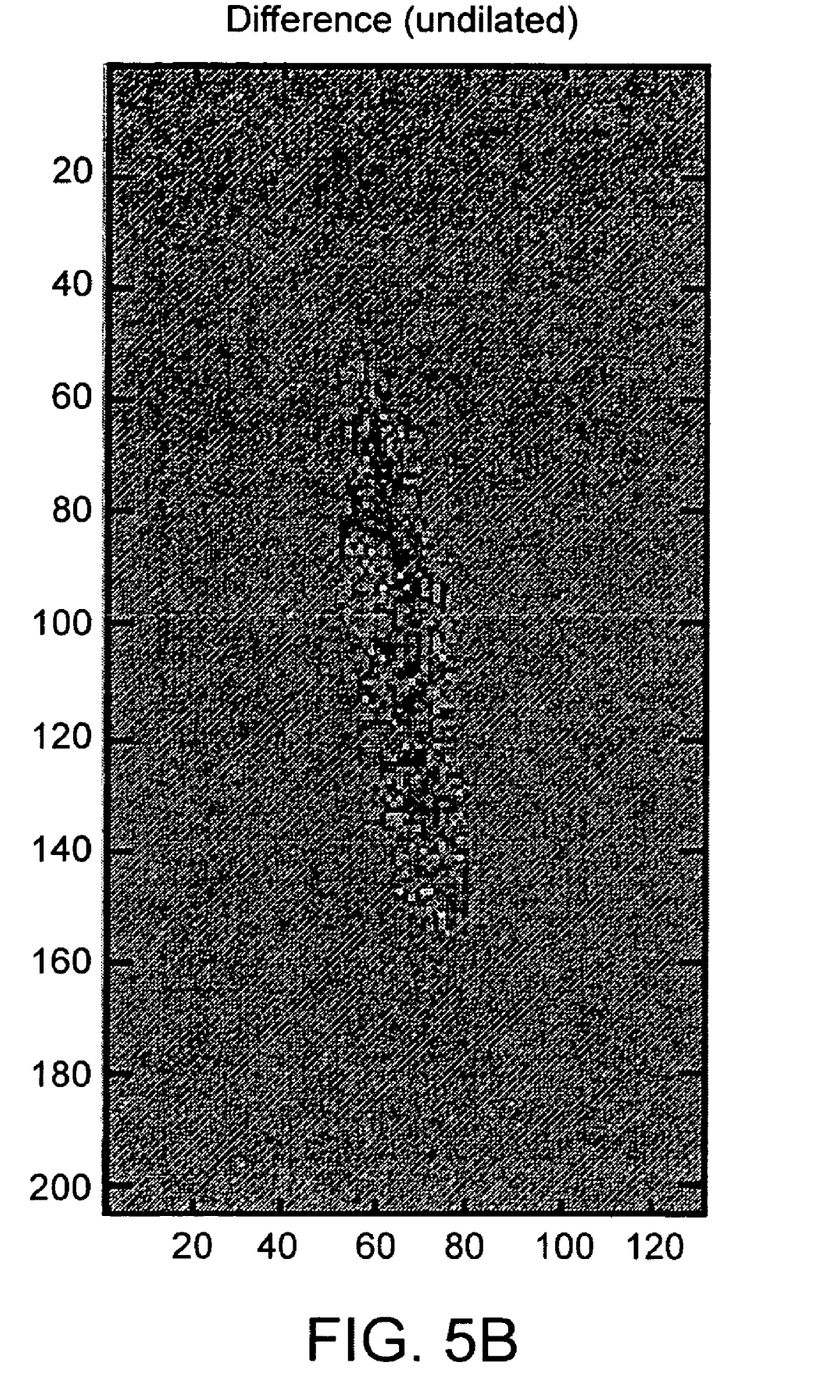

As shown in FIGS. 5A and 5B, the inpainting procedure is biased by minute calcific deposits just outside the annotated areas. These calcific rests are missed by the physician and became apparent only when zooming into pixel level. Since the inpainting methods rely entirely on boundary information, we had to expand the annotated areas in order to avoid faulty results as much as possible. Thus, the next step is to iterate the inpainting process for each calcified area of an image, so that each area is expanded in order to yield the maximum SNR (see Algorithm 1).

Following this, ten images that showed light to moderate calcifications were chosen based on the criteria that if anything decisive on images that are not heavily calcified can be concluded, then more severe calcifications can be easily quantified.

Figure 6:
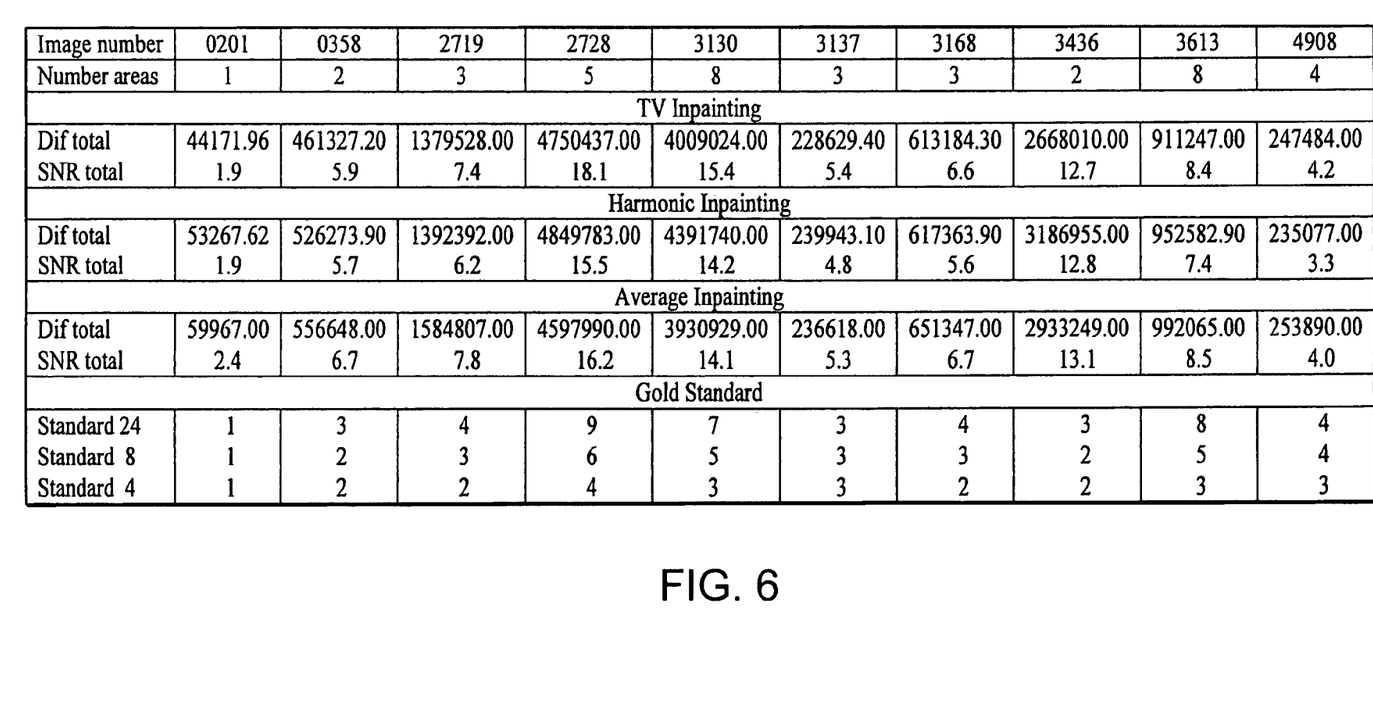
FIG. 6 is a table showing the SNR values and sum of the average differences between the original and inpainted images when the various inpainting methods described in the present invention are used on 10 test images.

As shown in FIG. 6, the ten selected images show light to moderate calcifications and contain 1-8 calcified areas. The number area denotes how many calcifications an image contains, Dif total denotes the sum of the average differences between the original and the inpainted image areas and SNR total the sum of the individual signal-to-noise ratios. The final three rows show the respective scores of the standard procedure.

Figure 7A:
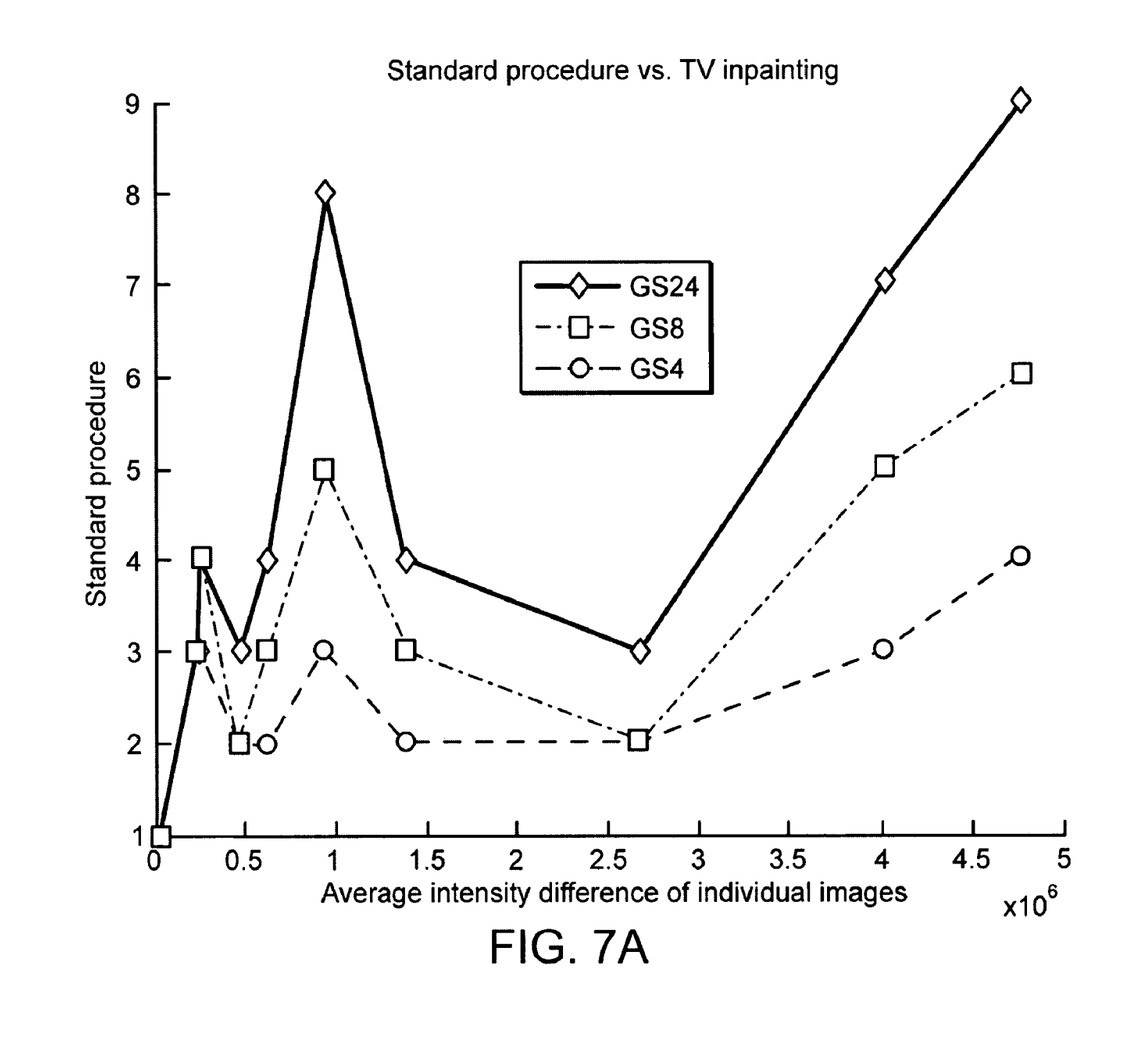
FIGS. 7A and 7B show comparative graphs of the difference inpainting methods of the present invention measured in standard procedure for detecting calcification of the aorta against the average intensity difference of individual images.
Figure 7B:
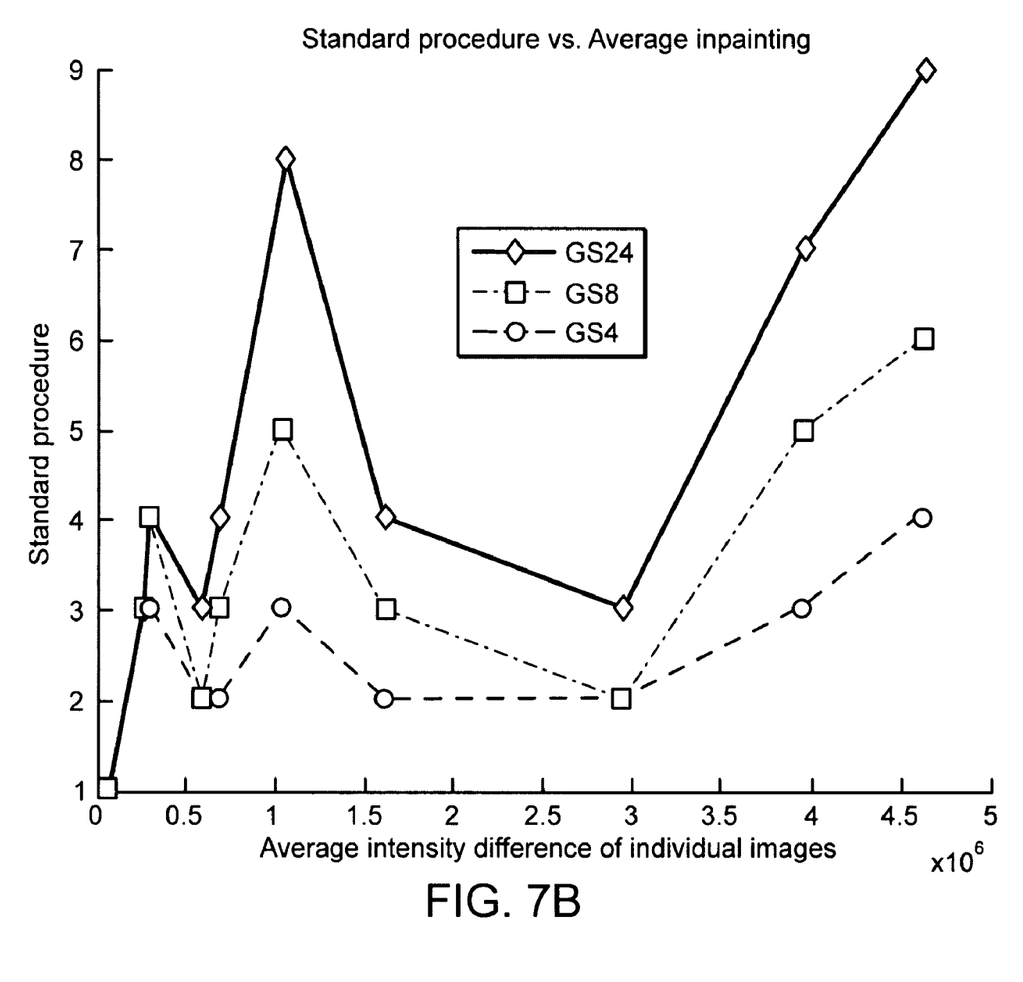

The quality of the method described is shown in FIGS. 7A and 7B, where all the differences for the respective areas for each image are summed up and plotted in sorted order against the respective scoring systems of the standard procedure. FIG. 7A shows the result for TV inpainting, and FIG. 7B shows the result for harmonic inpainting. From the graphs, it is apparent that each inpainting method offers more possibility for discerning the different stages of plaque development than previous known procedures.

It will be appreciated that modifications to or variations of the embodiments described and illustrated may be made within the scope of this application as set out in the appended claims.

The invention claimed is:

1. A method of deriving a quantitative measure of a degree of calcification of a blood vessel by processing an image of at least apart of the blood vessel containing said calcification, which method comprises:
    taking a starting set of digital data representative of an image of at least part of a blood vessel containing an area of calcification, said area of calcification being set against a background area;
    using an inpainting method to replace digital data in said starting set of digital data representing the calcification with data extrapolating the background to extend over the area of calcification, and so generating an inpainted set of digital data; and
    computing the difference between the starting set of digital data and the inpainted set of digital data to obtain a result representative of the degree of calcification of the blood vessel.

2. A method as claimed in claim 1, further comprising the preliminary steps of estimating a boundary of the area of calcification, wherein the step of inpainting comprises replacing digital data within the boundary with data extrapolating the background outside the boundary to extend over the area within the boundary.

3. A method as claimed in claim 2, further comprising:
    calculating a signal to noise ratio along the boundary of the calcification between the inpainted set of digital data and the starting set of digital data;
    increasing the area within the boundary, and repeating the step of calculating the signal to noise ratio along the boundary; and
    repeating the steps of increasing the area within the boundary and then calculating the signal to noise ratio between the inpainted set of digital data and the starting set of digital data along the boundary until a maximum signal to noise ratio is reached.

4. A method as claimed in claim 3, further comprising calculating the average intensity difference between the inpainted set of digital data and the staffing set of digital data, wherein the difference is representative of the degree of calcification of the blood vessel.

5. A method as claimed in claim 4, wherein the method of inpainting is TV inpainting.

6. A method as claimed in claim 5, wherein the method of inpainting is harmonic inpainting.

7. A method as claimed in claim 6, wherein the method of inpainting is average inpainting.

8. A method as claimed in claim 1, wherein said blood vessel is an artery.

9. A method as claimed in claim 8, wherein said artery is an aorta.

10. An instruction set for enabling generation of a quantitative measure of a calcification from an image of at least part of a blood vessel, the instruction set comprising instructions for:
    inpainting the image to replace digital data in said set of digital data representative of the blood vessel with data extrapolating said background to extend over the area of calcification
    using an inpainting method to replace digital data in said starting set of digital data representing the calcification with data extrapolating the background to extend over the area of calcification to generate an inpainted set of digital data;
    computing the difference between the starting set of digital data and the inpainted set of digital data to obtain a result representative of the degree of calcification of the blood vessel; and
    outputting the said quantitative measure.

11. An instruction set as claimed in claim 10, further comprising instructions for estimating a boundary of the area of calcification, wherein the step of inpainting comprises replacing digital data within the boundary with data extrapolating the background outside the boundary to extend over the area within the boundary.

12. An instruction set as claimed in claim 11, further comprising instructions for:
    calculating a signal to noise ratio along the boundary of the calcification between the inpainted set of digital data and the starting set of digital data;
    increasing the area within the boundary, and repeating the step of calculating the signal to noise ratio along the boundary; and
    repeating the steps of increasing the area within the boundary and then calculating the signal to noise ratio between the inpainted set of digital data and the starting set of digital data along the boundary until a maximum signal to noise ratio is reached.

13. An instruction set as claimed in claim 12, further comprising instructions for calculating the average intensity difference between the inpainted set of digital data and the starting set of digital data, wherein the difference is representative of the degree of calcification of the blood vessel.

14. An instruction set as claimed in claim 10, wherein the method of inpainting is TV inpainting.

15. A instruction set as claimed in claim 10, wherein the method of inpainting is harmonic inpainting.

16. A instruction set as claimed in claim 10, wherein the method of inpainting is average inpainting.

17. An instruction set as claimed in claim 10, wherein said blood vessel is an artery.

18. An instruction set as claimed in claim 17, wherein said artery is an aorta.

* * * * *